United States Patent
Rifkin et al.

(10) Patent No.: US 10,285,004 B2
(45) Date of Patent: *May 7, 2019

(54) GEOFENCED UNIVERSAL URL FOR SHARED MEDIA

(71) Applicant: Aircam Inc., Santa Monica, CA (US)

(72) Inventors: Evan Rifkin, Pacific Palisades, CA (US); David Hopkins, Santa Monica, CA (US); Ryan Rifkin, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/926,821

(22) Filed: Mar. 20, 2018

(65) Prior Publication Data
US 2019/0082290 A1 Mar. 14, 2019

Related U.S. Application Data

(63) Continuation of application No. 15/698,914, filed on Sep. 8, 2017, now Pat. No. 9,961,493.

(51) Int. Cl.
| | |
|---|---|
| *H04W 24/00* | (2009.01) |
| *H04W 4/021* | (2018.01) |
| *H04W 4/21* | (2018.01) |
| *H04L 29/08* | (2006.01) |

(52) U.S. Cl.
CPC ............ *H04W 4/021* (2013.01); *H04L 67/18* (2013.01); *H04W 4/21* (2018.02)

(58) Field of Classification Search
CPC .. H04L 29/08657; H04W 4/02; H04W 4/029; H04W 8/18
See application file for complete search history.

(56) References Cited

U.S. PATENT DOCUMENTS

| | | | |
|---|---|---|---|
| 7,366,523 B2 | 4/2008 | Viikari et al. | |
| 8,260,320 B2* | 9/2012 | Herz | H04M 3/42348 455/456.1 |
| 9,589,255 B1 | 3/2017 | Sandrew | |
| 9,615,201 B2 | 4/2017 | Alkabra et al. | |
| 9,628,950 B1 | 4/2017 | Noeth et al. | |

(Continued)

FOREIGN PATENT DOCUMENTS

WO 2012153986 A2 11/2012

OTHER PUBLICATIONS

Lautamo, Molly, "Gluon: A photo-sharing app based on where you go, not who you know", website article posted Jun. 23, 2016, http://www.santacruztechbeat.com/2016/06/23/gluon-photo-sharing-app/, website last accessed Sep. 7, 2017, pp. 1-5.

*Primary Examiner* — Shantell L Heiber
(74) *Attorney, Agent, or Firm* — SoCal IP Law Group LLP; Steven C. Sereboff

(57) ABSTRACT

There is disclosed herein a system and method for enabling access to media. The method includes receiving media and a media location indicating a location from which the media was shared, storing the media in conjunction with a geofence area defined by the media location plus a pre-determined area around the media location, receiving a request for any media from a device along with a device location indicating a location of the device making the request, and comparing the device location with the geofence area and, when the device location is within the geofence area, providing access to the media, and when the device location is outside of the geofence area, denying access to the media.

14 Claims, 11 Drawing Sheets

(56) References Cited

U.S. PATENT DOCUMENTS

| | | |
|---|---|---|
| 9,635,108 B2 | 4/2017 | Thomas |
| 10,069,792 B2* | 9/2018 | Maslak ............... H04L 61/1511 |
| 2003/0004916 A1 | 1/2003 | Lewis |
| 2007/0155307 A1 | 7/2007 | Ng et al. |
| 2008/0062940 A1 | 3/2008 | Othmer et al. |
| 2009/0054092 A1 | 2/2009 | Stonefield et al. |
| 2013/0109412 A1 | 5/2013 | Nguyen et al. |
| 2013/0111520 A1 | 5/2013 | Lo et al. |
| 2013/0217332 A1 | 8/2013 | Altman et al. |
| 2013/0331127 A1 | 12/2013 | Sabatelli et al. |
| 2014/0018105 A1* | 1/2014 | O'Neil ................... H04W 4/80 455/456.3 |
| 2014/0206325 A1* | 7/2014 | Jessup ................. G06F 17/3087 455/414.3 |
| 2014/0207889 A1 | 7/2014 | King et al. |
| 2014/0213227 A1 | 7/2014 | Rao |
| 2014/0249938 A1 | 9/2014 | Garrett et al. |
| 2015/0002271 A1 | 1/2015 | Lee et al. |
| 2015/0058409 A1 | 2/2015 | Wang |
| 2015/0065172 A1* | 3/2015 | Do ........................ H04L 63/107 455/456.3 |
| 2015/0067163 A1* | 3/2015 | Bahnsen ................ H04W 4/02 709/225 |
| 2015/0088847 A1* | 3/2015 | Nelson ............. G06F 17/30861 707/706 |
| 2015/0189535 A1 | 7/2015 | Bekiares et al. |
| 2015/0262195 A1 | 9/2015 | Bergdale et al. |
| 2015/0281878 A1 | 10/2015 | Roundtree et al. |
| 2015/0288760 A1* | 10/2015 | Thomas ............... H04L 67/1095 709/203 |
| 2015/0295888 A1* | 10/2015 | Maslak ............... H04L 61/1511 709/219 |
| 2015/0356121 A1 | 12/2015 | Schmelzer |
| 2016/0012465 A1 | 1/2016 | Sharp |
| 2016/0021037 A1* | 1/2016 | Hewitt ................. H04L 51/046 715/752 |
| 2016/0065626 A1 | 3/2016 | Jain et al. |
| 2016/0173625 A1 | 6/2016 | Ruben et al. |
| 2016/0212190 A1* | 7/2016 | Kim .................... H04L 65/602 |
| 2017/0199850 A1* | 7/2017 | Mishra ................ G06F 17/2235 |

\* cited by examiner

GEOFENCED UNIVERSAL URL FOR SHARED MEDIA

RELATED APPLICATION INFORMATION

This patent is a continuation and claims priority to U.S. patent application Ser. No. 15/698,914, filed Sep. 8, 2017, entitled GEOFENCED UNIVERSAL URL.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to access to shared media content.

Description of the Related Art

Social networks are incredibly useful at connecting groups of people who know or meet one another. Social networks are typically made up of groups of one's friends and acquaintances. The primary benefit of a large social network, such as Facebook®, is its so-called "network effects." As more people join the network, the value of the network and its usefulness at connecting people rises as well. Specifically, the likelihood that one would meet someone who is not already a member of Facebook goes down. In this way, it is increasingly easy to "connect" with other Facebook users. Other social networks operate similarly.

Once two users have joined Facebook, they each have unique logins, typically a user's email address or, in other social networks, a chosen username or handle. This is beneficial because it adds security and enables the social network to extract personal information and associate it with a particular user and user account. Likewise, it enables users to share links, photographs, video, and other media with only certain groups, such as their "friends" or "family" or other groups defined by the individuals themselves.

Email is another simple method that may be used to share media. A user need only identify each email address to whom he or she wishes to transmit some media. Then, the user may attach the media (or link to it) within the email and send it to those email addresses. Simple message service (SMS) or multimedia message service (MMS) work similarly, enabling individuals to share on a one-to-one or one-to-many basis, but requires knowledge of the appropriate phone numbers to which to communicate the SMS or MMS.

Another sharing technique is to use hashtags to identify particular topics, locations, or subjects. These hashtags in the general form #[topic, subject, location, etc.], such as #beachday or #Rome, enable the media to be identified as associated with a particular topic or location. However, users must affirmatively input hashtags or otherwise associate them with the media. Otherwise, the uploaded image remains merely another piece of media that is largely uncategorized and difficult to "discover" through computer-based techniques such as searching or aggregation.

Another technique for sharing media is the use of web pages. Newspapers and television networks and search engines do this by making "home pages" that include content interspersed throughout these pages. Individuals do this by uploading media to their own web pages for perusal by others. However, to access this content, one must know the particular web page, news outlet, or other destination and affirmatively seek it out or otherwise be directed there by a search engine. One such direct access may be by typing in a specific uniform resource locator (URL) or visiting a URL where one is aware that desired media is available.

One major downside of each of these methods is that each requires the exchange or prior knowledge of specific information (e.g., a website address, a hashtag, an email address, or at minimum a username in the case of social networks) before two or more users can easily share media content between each other.

While all of these systems have their merits, there exist certain circumstances in which these types of systems break down. For example, attending a wedding at a remote venue with a disparate group of people who include family, friends from different friend groups, different schools, and different jobs, many of whom may have no prior relationship (and potentially desire no ongoing relationship) with each other. Or, a large group of people attending a concert or sporting event may share a unique experience at a particular location, but have no other relationship with one another apart from this single shared location and experience.

These people may desire to share with one another photographs, videos, links, text, audio, or other media and be unable to do so efficiently because they cannot easily share usernames, websites, hashtags, or the like with one another. As a result, group experiences are often not conducive to the sharing of media amongst a group of people having these shared experiences.

Some social networks have handled this situation by enabling the upload of location-based photographs. However, this functionality still relies upon finding the appropriate location in a social networking application, tagging the media with that location, or on enabling an application to automatically share the media's location when that media is uploaded. Then, other users must find that location to view the media and, often, must find the appropriate date or time from potentially hundreds or thousands of dates and times for particular locations.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
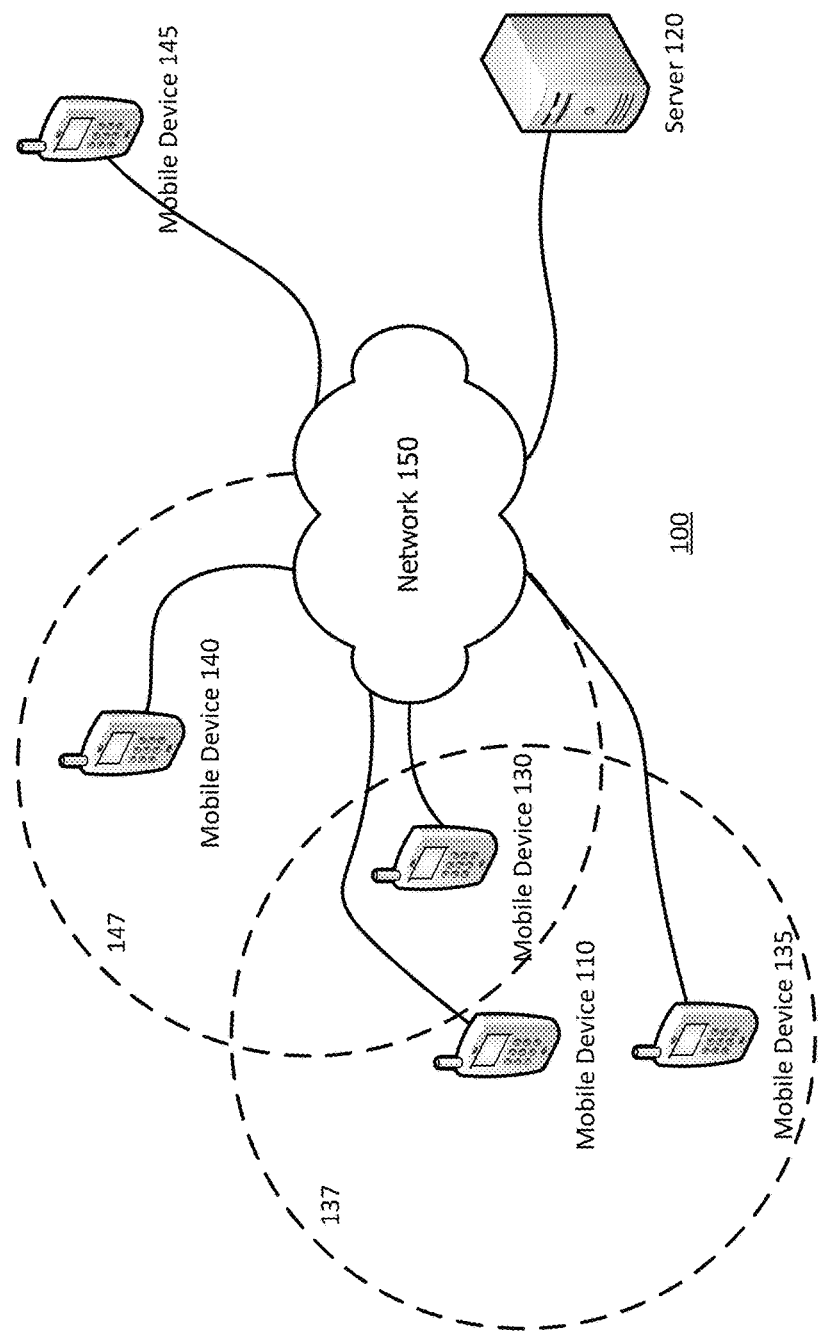
FIG. 1 is a block diagram of a system for a geofenced universal URL.

Referring now to FIG. 1, a block diagram of a system for a geofenced universal URL is shown. The system includes a mobile device 110, a server 120, a mobile device 130, a mobile device 135, a mobile device 140, and a mobile device 145, all interconnected by a network 150.

The mobile device 110 may be a smartphone, tablet, or other location-aware computing device. The mobile device 110 either includes a media capture device or has access to one (e.g. through a USB (universal serial bus) connector or wirelessly). The media capture device may be a microphone, a camera (still or video), a keyboard or on-screen keyboard, and similar media capture or media creation devices. The term "media" as used herein refers to an electronic conveyance of expression, thought, or ideas between two or more individuals that is identified on, created by, or stored on a computing device and that is uploaded to a server and stored in association with a particular, physical location. Media may be or include, text, hyperlinks, audio, video, and still images. The association with a particular, physical location may be that the media was created, uploaded, or otherwise identified at that location.

The server 120 server is another computing device. The server 120 is designed in such a way that it is suitable for running database software that stores data related to each piece of media uploaded to the server 120. The server 120 is shown as a single computing device. However, in implementation, the server 120 may be multiple or many computing devices. For example, the server may include a database server and a file server. As the volume of images stored by the server grows, the file server may become a cluster of servers or may include media-serving servers throughout the United States or world to better serve those requesting storage and retrieval of media. Likewise, database servers may be localized so that requests are handled by a server 120 closest to the device requesting storage or retrieval of media.

The mobile devices 130 and 135 are substantially similar to mobile device 120, but are shown for purposes of retrieval of media uploaded to the server 120 by mobile device 110. The mobile devices 130 and 135 are shown within a pre-determined area 137 surrounding mobile device 110. As will be discussed more fully below, these mobile devices 130 and 135 may, therefore, obtain access to media uploaded by mobile device 110. The predetermined area 137 is shown as a radius around the mobile device 110 but may be any shape. Mobile devices 130 and 135 may also include media capture devices and may upload media to the server 120 or retrieve media from the server 120.

The mobile devices 140 and 145 are substantially similar to mobile device 120, but are shown outside of the pre-determined area 137. Accordingly, these devices 140 and 145 cannot access media uploaded by the mobile device 110.

As can also be seen, mobile devices 130 and 140 are both within pre-determined area 147, but mobile devices 110, 135, and 145 are not within those areas. Therefore, should mobile devices 130 or 140 seek access to media available within pre-determined area 147, they will be provided access to that media. Mobile devices 110, 135, and 145 will remain unaware that media is available in pre-determined area 147 unless and until they are moved to within that pre-determined area themselves.

It should also be noted that mobile device 130 may see two distinct groups of media, that of pre-determined area 137 and that of pre-determined area 147. But no other mobile device shown can see both sets of media and that mobile device 145 can see none.

Finally, the location of the server 120 or any part of the network 150 is generally irrelevant to whether uploaded media may be accessed by one or more mobile devices.

The network 150 is a computer network that provides interconnectivity between the mobile device 110, the server 120, the mobile devices 130, 135, 140, and 145. The network 150 may be or include the internet. The network 150 may rely upon well-known protocols for the interconnection of computing devices such as TCP/IP, Ethernet, Bluetooth, and other protocols. The network 150 enables the mobile devices 110, 130, 135, 140, and 145 to communicate with one another and with the server 120 to store or request media.

Figure 2:
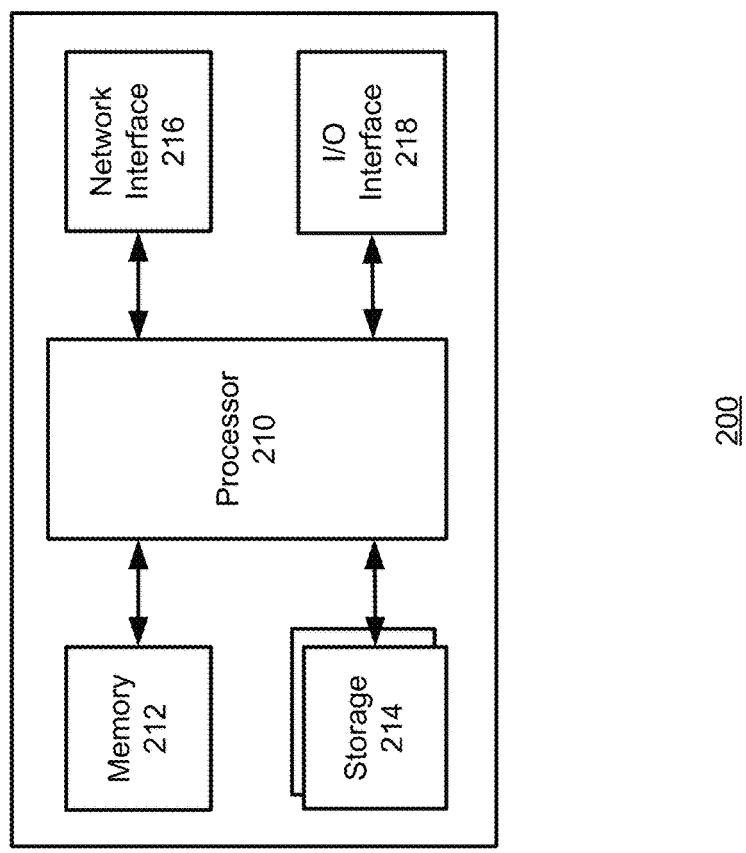
FIG. 2 is a block diagram of a computing device.

Turning now to FIG. 2 there is shown a block diagram of a computing device 200, which is representative of the mobile device 110, the server 120, and the mobile device 130 in FIG. 1. The computing device 200 may be, for example, a desktop or laptop computer, a server computer, a tablet, a smartphone or other mobile device. The computing device 200 may include software and/or hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein. For example, a global positioning system (GPS) receiver or similar hardware may provide location-based services.

The computing device 200 has a processor 210 coupled to a memory 212, storage 214, a network interface 216 and an I/O interface 218. The processor 210 may be or include one or more microprocessors, field programmable gate arrays (FPGAs), application specific integrated circuits (ASICs), programmable logic devices (PLDs) and programmable logic arrays (PLAs).

The memory 212 may be or include RAM, ROM, DRAM, SRAM and MRAM, and may include firmware, such as static data or fixed instructions, BIOS, system functions, configuration data, and other routines used during the operation of the computing device 200 and processor 210. The memory 212 also provides a storage area for data and instructions associated with applications and data handled by the processor 210. As used herein the term "memory" corresponds to the memory 212 and explicitly excludes transitory media such as signals or waveforms The storage 214 provides non-volatile, bulk or long-term storage of data or instructions in the computing device 200. The storage 214 may take the form of a magnetic or solid state disk, tape, CD, DVD, or other reasonably high capacity addressable or serial storage medium. Multiple storage devices may be provided or available to the computing device 200. Some of these storage devices may be external to the computing device 200, such as network storage or cloud-based storage. As used herein, the terms "storage" and "storage medium" correspond to the storage 214 and explicitly exclude transitory media such as signals or waveforms. In some cases, such as those involving solid state memory devices, the memory 212 and storage 214 may be a single device.

The network interface 216 includes an interface to a network such as network 150 (FIG. 1). The network interface 216 may be wired or wireless.

The I/O interface 218 interfaces the processor 210 to peripherals (not shown) such as displays, video and still cameras, microphones, keyboards and USB devices.

Figure 3:
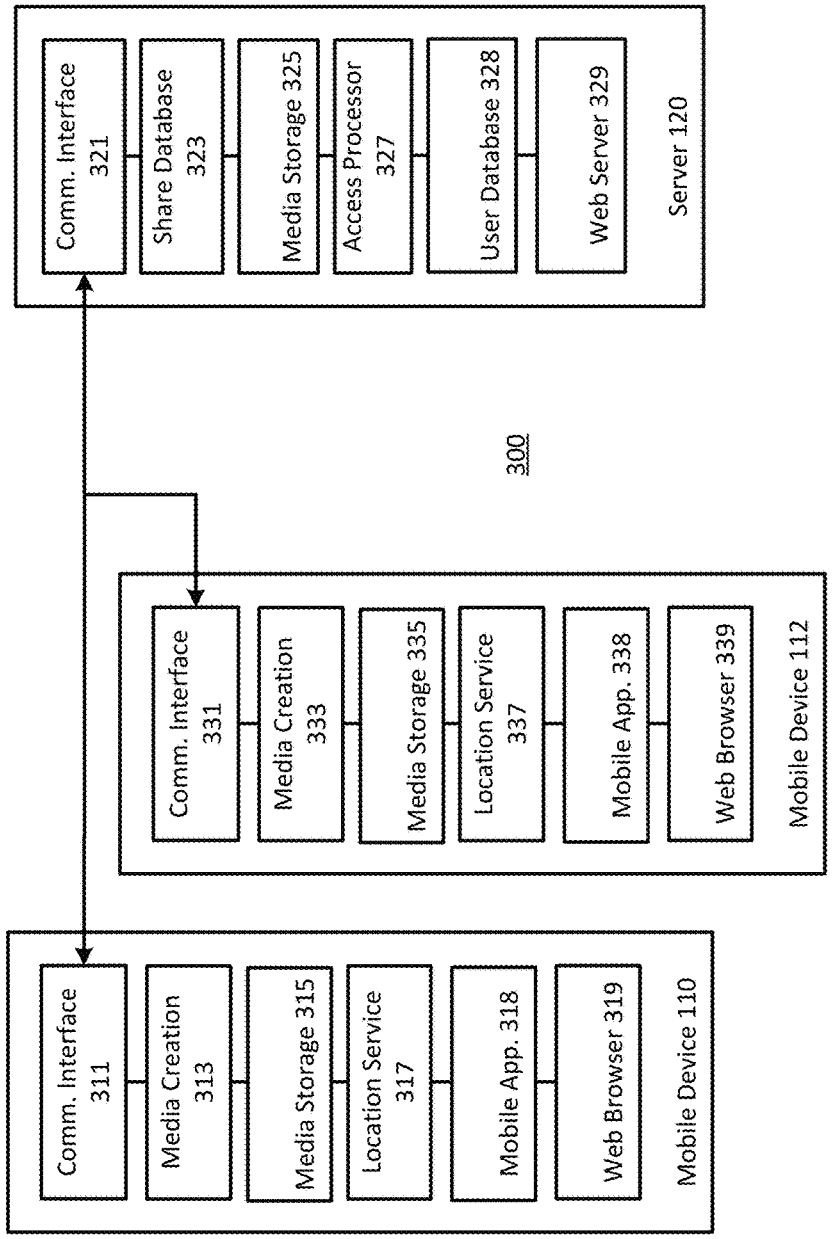
FIG. 3 is a functional diagram of a system for geofenced universal URL.

FIG. 3 is a functional diagram of a system 300 for geofenced universal URL. The system 300 includes the mobile device 110, mobile device 130 and server 120. These mobile devices 110 and 130 are shown because mobile device 130 is within the pre-determined area 137 (FIG. 1) and may access media uploaded by mobile device 110.

The mobile device 110 includes a communications interface 311, media creation 313, media storage 315, location service 317, mobile application 318, and a web browser 319.

The communications interface 311 is software that enables the mobile device 110 to communicate with the server 120. The communications interface may operate as application programming interface (API) calls to the server's corresponding communications interface 321. Alternatively, the communications interface 311 may operate as one or more typical hypertext transfer protocol (secure) (HTTP (S) requests or similar requests made between the communications interface 311 and the communications interface 321 of the server 120.

The communications interface 311 enables the mobile device to upload media and location information, along with any settings pertaining to the media, to the server 120 for storage. The communications interface 311 may also enable updates and information stored on the server 120 to be accessed by the mobile device 110. The communications interface 311 may also enable communications with other mobile devices and/or other network devices including the internet.

The media creation 313 is software that enables media to be created. This software may include camera image capture and storage software, audio capture software, or a web browser or other source for media obtained from sources other than the mobile device 110 directly. For example, images may in some cases be obtained from third party sources and may be "created" by the media creation 313 in the sense that it is added to the group of media that may be uploaded to the server 120.

The media storage 315 is storage for media created by the media creation 313. The media storage may include memory or a storage medium, but may also include database software for managing data associated with a particular piece of media. The data associated with a particular piece of media may include location data for a location at which the media was created, a pre-determined area around which the media may be available, any settings associated with the media (e.g., access controls, a password, filters applied), expiration time of a media, and a username or other identifying characteristic for an individual or mobile device that created the media.

As used herein the phrase "pre-determined area" means a physical location around a mobile device set by a user uploading media to a remote server within which the media will be accessible. The pre-determined area is limited to a finite distance around the mobile device substantially less than the world, the United States, a state or even a city. The meaning of "pre-determined area" specifically excludes any area defined by "friend" groups, membership in any service or system, or other systems that require a user join a service or otherwise selectively gate access based upon anything other than a mobile device's current physical location.

The pre-determined area may be a radius (e.g. defined by a distance from a center point of the location from which the media was uploaded) a square area, a rectangular area, or any other shaped area, or may be a user-set fence of a user-determined area surrounding the location from which the media was uploaded. The pre-determined area may be unusually shaped to specifically include or exclude certain physical locations. For example, a user may physically draw on a visual representation of a map showing a mobile device's current location to thereby set the pre-determined area. The pre-determined area may have a default setting of a radius or other area of a pre-determined shape and size (e.g. 500 ft. radius or a square of a certain square footage) that is used in the absence of an alteration by a user uploading media.

When a mobile device first makes a request, it may have access to the media because it is at a location within the pre-determined area. However, the media available at that location may time-out after a pre-determined amount of time or if an uploading individual who provided the media has left a pre-determined area. Alternatively, the mobile device may move from one location to another, moving outside of the pre-determined area. At that point, access to the media that was initially available may become unavailable. Access is not tied to the accessing mobile device or the particular user, but is instead dependent upon the mobile device's location. However, the pre-determined area may be tied to the sharing mobile device or user. For example, the pre-determined area may be a 500 yard circle surrounding a particular mobile device. As that mobile device is moved, the circle likewise moves in real-time. So, shared media that is available at a location may become unavailable, immediately or upon a time-out period, after the mobile device that shared the media moves to a new location outside of the share pre-determined area.

The location service 317 is software that may rely upon hardware such as a GPS receiver or wireless-receiver network hardware for assisted location and tracks the location of the mobile device 110. The location service 317 may be "always-on" or may operate on an as-needed basis when media is created or captured. The location service 317 stores the location a media was captured, created, or shared in conjunction with the media itself. This location may be stored along with the media in media storage 315.

The mobile application 318 is an optional component. All functions, at least all basic functions, described herein may be undertaken by a mobile device using only the web browser 319. Specifically, a user may upload media tied to a specific location and interact with existing media (e.g. view or download) available to a mobile device 110 at a specific location using a web browser 319 at a universal URL alone. However, additional functions may be available to users of a mobile application 318. The mobile application 318 may utilize the other functions of the mobile device 110 in order to implement some of the functions and processes described herein. For example, the mobile application 318 may enable media to be captured, stored, and shared in conjunction with a pre-determined area along with settings that may or may not be available to a mobile application user. For example, limiting access to user groups within the pre-determined area may require group membership which may be limited to users of the mobile application 318. The mobile application 318 may be obtained from an app store such as the Apple® App Store® or Google® Play® store. Some or all of the mobile application 318 may be in the form of a non-downloaded web application.

The mobile application 318 may incorporate aspects of a more-typical social network so as to enable functions such as friend's lists, messaging, sharing, and other, similar functions. However, as already pointed out above, the mobile application 318 is optional for almost all interactions.

The web browser 319 is software that enables the mobile device 110 to access the world wide web (WWW). The web functions typical of web browser software, but may be capable of accessing a non-unique uniform resource locator (URL) to upload media or to obtain access to any media that was shared in the location plus a radius around that location. The web browser 319 may also be used to upload media, as desired, or to access media once a particular location has shared media within it.

The server 120 includes a communications interface 321, a share database 323, media storage 325, access processor 327, a user database 328, and a web server 329.

The communications interface 321 is substantially similar to the communications interface 311 except that the communications interface 321 is designed in such a way as to be capable of handling communications requests, data transmissions, and upload of media from many hundreds or thousands of users substantially simultaneously. As discussed above, this may be handled by providing multiple servers 320 or implementing server 120 as a server cluster or a group of server clusters, each placed strategically throughout the world so as to each handle a subset of communications (and other functions) for the overall user base.

The communications interface 321 may include authentication systems suitable for enabling mobile device, such as mobile device 110, to login or otherwise authenticate to the server 120 before they may perform some functions using the server 120. Still, other functions, as discussed more fully below, may require no login or authentication at all.

The communications interface 321 includes the capability to respond to HTTP(S) requests in conjunction with the operation of the web server 329 (discussed below). As with the other communication capabilities provided by the communications interface 321, these HTTP(S) responses may also be scalable across multiple servers and/or web services so as to service many hundreds or thousands of requests at once.

The share database 323 is database software running on the server 120 that stores data related to each piece of media shared. Media storage 235 is shown as separate from the share database 323. In some implementations, these may be a single software and hardware combination. In some instances, the share database 323 and the media storage 325 maybe integrated physically or logically in one or more computing devices.

The share database 323 stores information about a particular user who shared media, metadata related to the media (e.g., resolution, any internal tags for the media, bitrate, the device that created the media, any identity for faces or other aspects detected within the media), the location at which the media was created or uploaded, any password or user-group limitations on access to the media, any related media or media uploaded at the same time or in the same location, a default or user-set radius around the upload or creation location from which anyone (or a set group of users or users with a password) may be able to access the media, and a time limit, if any, for how long after creation or upload the media may be accessed by users at that location. The share database 323 may also store data unseen by users such as number of times a particular media has been accessed by others, locations of those accesses, internet protocol addresses associated with those accesses, and other, similar data. This type of data may inform the server 120 systems allocation of media across a server cluster or group of server clusters.

The media storage 325 is storage, such as hard drive space, data stored in memory on a server, or other long-term storage for the media. The media storage 325 is in association with the share database 323 to the extent that the share database 323 identifies the location of and other characteristics associated with the media stored in the media storage 325. Media storage 325 may be long-term or, based upon information in the share database 323, may only be used to store uploaded media for a short time. For example, media may expire and be automatically deleted or rendered unavailable within minutes, hours, or days of upload or creation based upon default media upload settings or on settings set by the user uploading or creating a particular piece of media. Whether or not the media remains available, it may or may not actually be deleted from the media storage 325 on the server 120.

The access processor 327 is software that interacts with the media storage 325 and share database 323 while in communication with a particular mobile device (e.g., mobile device 130) to determine whether or not a device requesting access to a particular piece of media stored in media storage 325 may access that media. At a most basic level, the media may be for a different location than that of the requesting device. In such cases, the access processor 327 may receive a location from a mobile device and determine that only particular media (media uploaded or created in that location and within a predetermined radius around that location) may be accessed by a requesting device. Other limitations may be imposed by uploaders or creators of media. For example, passwords user friendship may be required before some media may be accessed. These limitations and others may be set in the share database 323 when media is uploaded to the server 120. The access processor 327 parses each media request and determines what media a particular user may access.

The user database 328 operates to store user-related data such as usernames, passwords, phone numbers, email addresses, and any other account information. The user database 328 may be accessed by the access processor 327 in cases in which only particular users are allowed to access a particular media. As discussed more fully below, becoming a "user" of the server 120 and associated systems is typically optional for accessing geofenced media. Still, the user database 328 may enable the system to operate as a more-typical social network in addition to the geofenced sharing of content disclosed herein.

The web server 329 is web server software suitable for responding to HTTP(S) requests by serving web pages and other appropriate responses. The web server 329 may also enable the upload of content directly from one or more web pages. This upload may involve the use of scripting languages, applets, or other similar functionality and may interact with the share database 323 and the media storage 325. These direct-from-web-page uploads may or may not identify a particular user and may be enabled for anyone within an area defined by a location and its immediate pre-determined radius. Anyone within that pre-determined area may be enabled, through a web-based interface to upload additional media to media already associated with that location.

The mobile device 130 includes a communications interface 331, media creation 333, media storage 335, location service 337, at least one mobile application 338, and a web browser 339. The general function of these elements will not be described again here.

In order to access any uploaded media within a particular location, the user of the mobile device 130 need use only a web browser 339. Based upon location data created by the location service 337 and provided to the server 120 in conjunction with a media request, the server 120 may provide access to media if the requesting mobile device 130 is at the location or within a pre-determined radius around the location. The server 120 may request a password, if one is required, and the mobile device's web browser 339 may operate as a user interface for this request process.

Description of Processes

Figure 4:
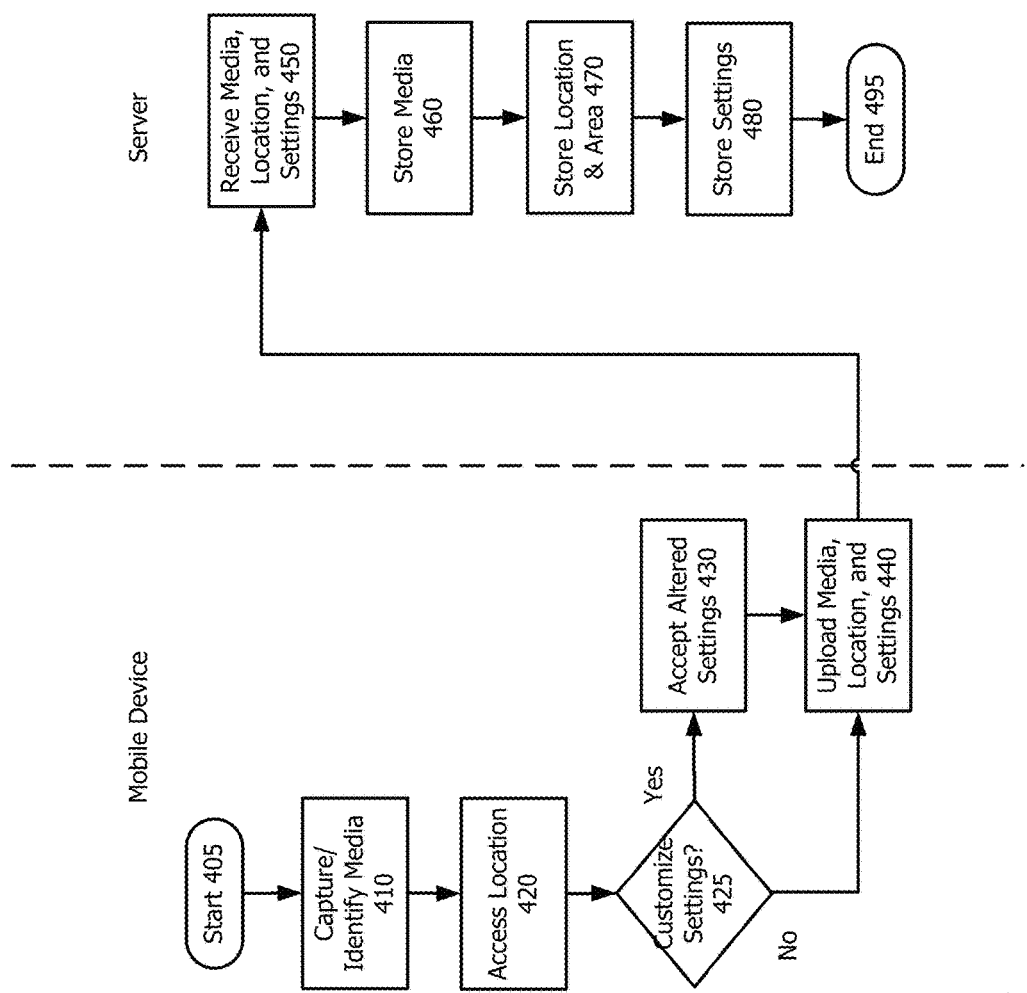
FIG. 4 is a flowchart of a process for media transmission and storage for a geofenced universal URL.

Referring now to FIG. 4 a flowchart of a process for media transmission and storage for a geofenced universal URL is shown. Though shown with a start 405 and an end 495, the process may repeat for each piece of media uploaded. Likewise, the process may repeat for different users uploading different sets of media.

Following start 405, the process begins with the capture or identification of media at 410.

Next, the location is accessed at 420. This may be using a global positioning system or similar system. This may, instead or in addition, rely upon the strength and availability of wireless networks nearby, or may be in relation to other users of the mobile application or to one or more users who have previously uploaded from that location or near that location.

At this point, the user may choose to customize settings 425 associated with the media he or she desires to upload and store on the server. Choosing to do so is a "yes" at 425. These settings may include setting a password, altering the pre-determined area around which the media may be available (e.g., making the availability pre-determined area smaller or larger—thereby shrinking or growing an associated geofence for the media), limiting access to the media to only "friends" or another subset of all users, altering a default time during which the uploaded media may be available, and altering whether others may add to the uploaded media and the like.

In some cases, the time during which uploaded media may be available may be only so long as a mobile device who uploaded the first piece of media for a given collection of media remains within the pre-determined area. Once that initiating user leaves the pre-determined area, all of the media in an associated collection may no longer be available. Alternatively, only the particular user's media may become unavailable, leaving all other media in a collection still available. Alternatively, all media may remain so long as at least one uploader remains within the pre-determined area. Once all uploaders' mobile devices have left the pre-determined area, the collection may time out, thereby making it unavailable. Alternatively, as mobile devices leave the pre-determined area, only their media may be rendered unavailable, leaving other media uploaded to an associated collection available until it times out or the mobile device from which the media was shared also leaves the pre-determined area.

For example, media may be available by default in a pre-determined area that is a radius of 1000 feet around an upload location, for a total of 8 hours to anyone within that 1000-foot radius, and anyone may be able to add to the group of media uploaded. Choosing the default settings is a "no" at 425. If the settings are altered, "yes" at 425, then the original uploader may, for example, alter these default settings to limit the radius to only 100 feet, to increase the time during which the media is available to 48 hours, may apply a password to access, and may limit those who are able to upload additional media to his "friends" within the application. In other cases, users may leave the default settings alone, increase the radius, decrease the availability time or make other changes to the default settings. The user may use a mobile application or web browser interface (e.g. a web-app) to make these changes. Media will only be available to mobile devices within that pre-determined area for the time during which the media is available.

Then, at 440, the media, location, and any default or altered settings are uploaded to the server. The uploaded media may be as simple as a single image or may be as complex as an entire set of videos, images, and hyperlinks.

The server receives the media, location, and settings at 450 and stores the media at 460. The media itself, as discussed above, is stored in media storage.

The location and area are stored at 470 in the share database. The associated settings are also stored at 480. In this way, both the media and any settings associated with access to that media are uploaded and stored on the server for access by others later. The share database may include the location associated with the uploaded media and a pre-determined area around which the media will be made available in addition to any other settings such as a time limit for review of the media and any password required to access the media in addition to the location.

Figure 5:
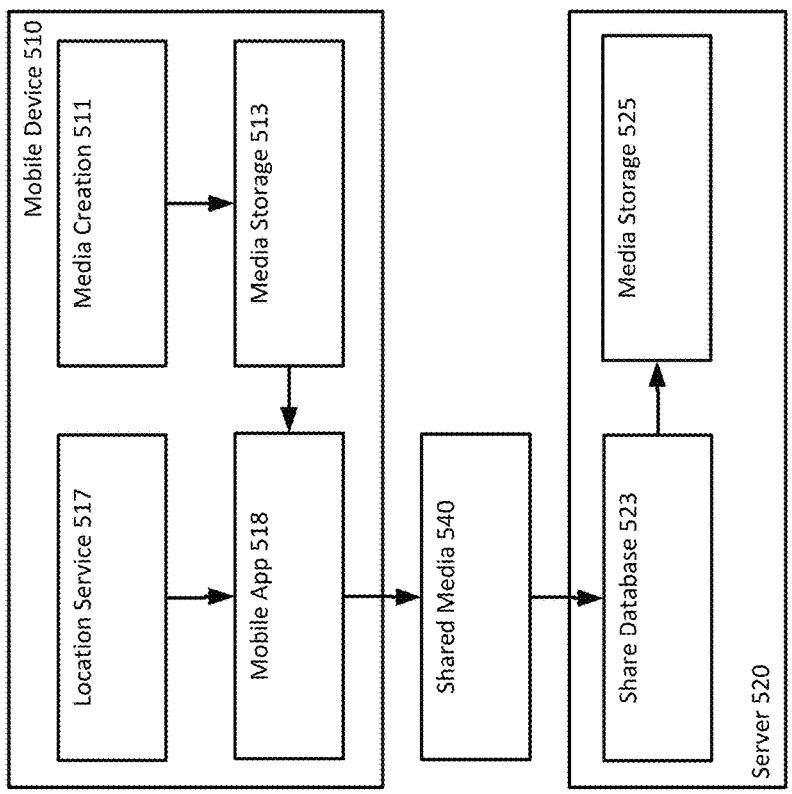
FIG. 5 is a functional diagram of a process for media transmission and storage for a geofenced universal URL.

Referring now to FIG. 5, a functional diagram of a process for media transmission and storage for a geofenced universal URL is shown. FIG. 5 shows the components of the overall system that operate to perform the steps described in FIG. 4. The elements of FIG. 5 are discussed above with respect to FIG. 3. That discussion will not be repeated here. Only their operation in conformity with the steps discussed above with regard to FIG. 4 will be described here.

Media may be captured using media creation 511. Although termed "creation," this may include receipt and storage or capture. Capture may be using a video camera, a still camera, a microphone, a keyboard or other similar media creation hardware 511 of the mobile device 510. The created media may be stored on the mobile device 510 in media storage 513.

The mobile device 510 may determine its location using its location service 517. The location service 517 returns a reasonably-accurate location so that the mobile device 510 may provide the location to the server 520. This location may be used as a basis for the pre-determined area around which media will be available when uploaded to a server.

Settings associated with the media may be input using a mobile app 518. This may be optional. These may include any alteration to the radius or other pre-determined area, specific users who should have access, timeout settings for the media after which it will no longer be available, a password to gain access, and similar settings. Though shown as uploaded by the mobile app 518, a web browser (e.g. web browser 319 of FIG. 3) may also be used to upload media. If a web browser is used, then the process may take place using a universal URL as discussed more fully below.

Shared media 540 may be uploaded to server 520. The uploaded media may be as simple as a single image or may be as complex as an entire set of videos, images, text, and hyperlinks. The media itself may be stored in media storage 525, while any settings associated with the media may be stored in share database 523. This media may, thereafter, be available for others within the pre-determined area.

Figure 6:
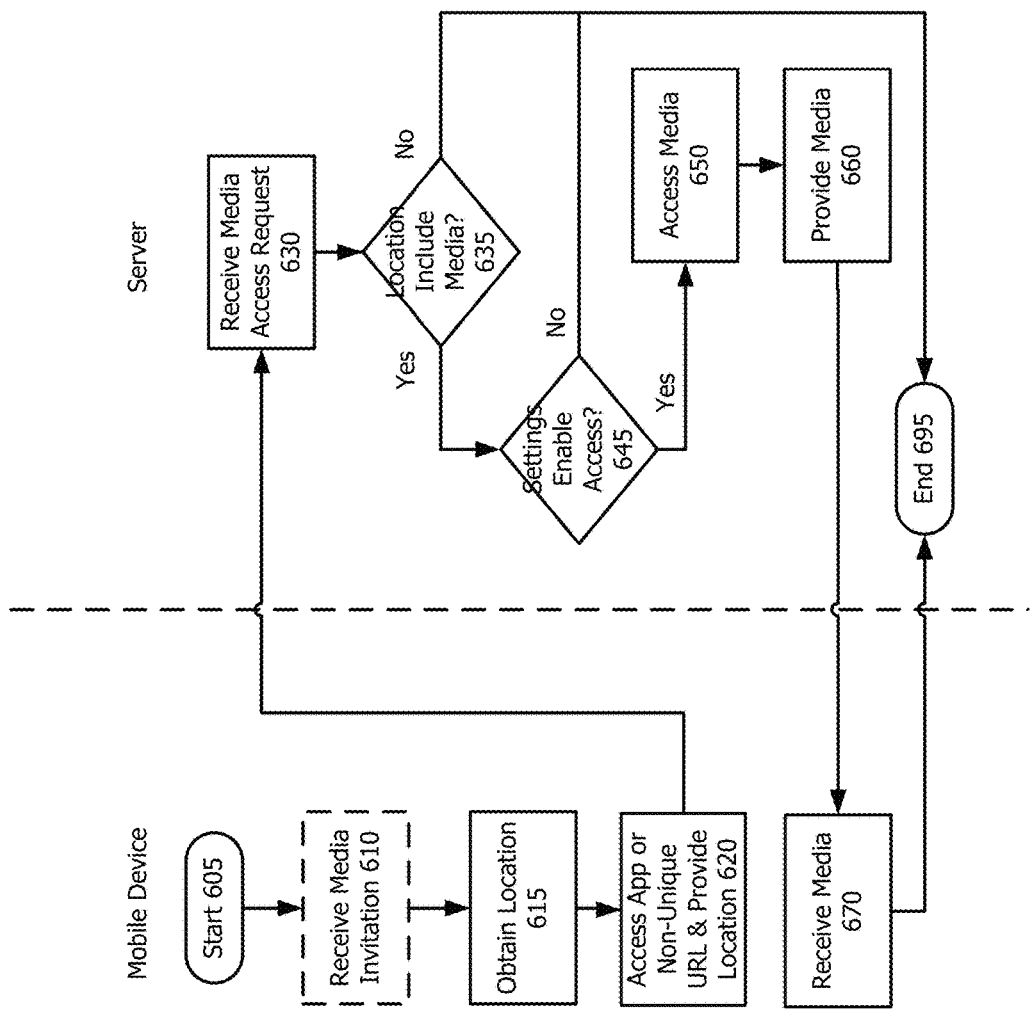
FIG. 6 is a flowchart of a process for request and fulfillment for a geofenced universal URL.

Turning now to FIG. 6, a flowchart of a process for request and fulfillment for a geofenced universal URL is shown. Though shown with a start 605 and an end 695, the process may repeat for each media request made by any user.

Figure 7:
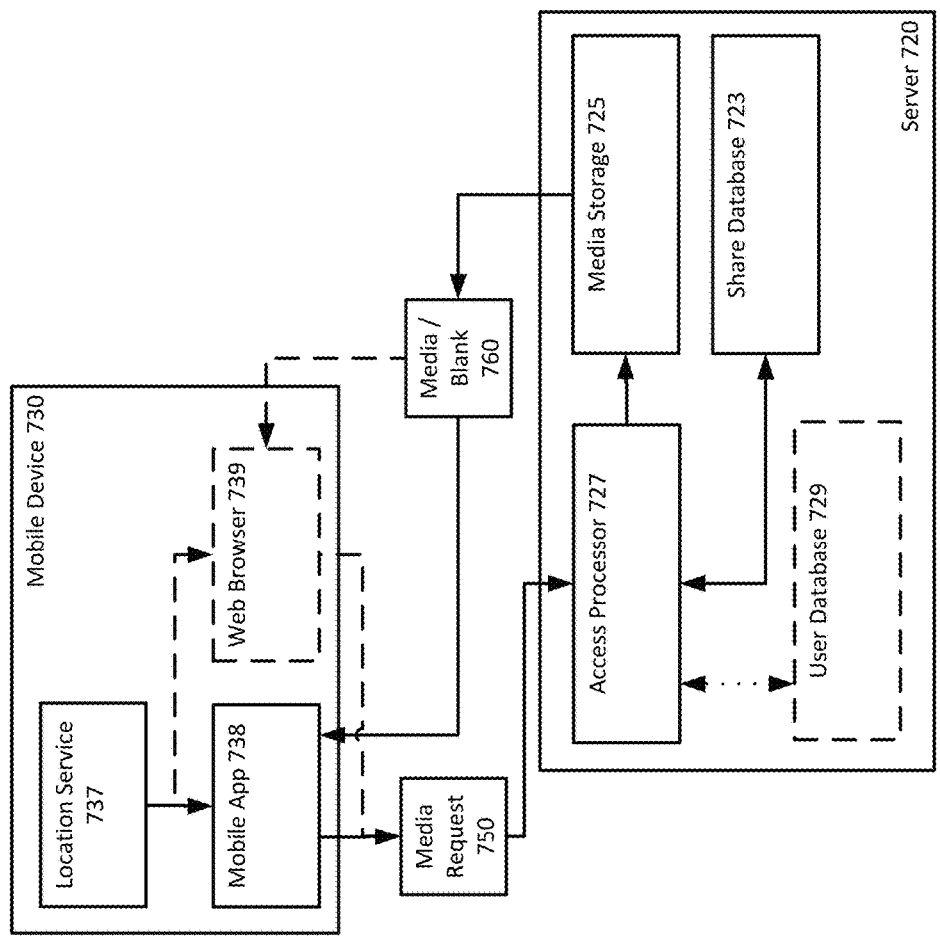
FIG. 7 is a functional diagram of a process for media request and fulfillment for a geofenced universal URL.

FIG. 7, also referred to herein, is a functional diagram of a process for media request and fulfillment for a geofenced universal URL. This is a functional diagram showing the active functional components and movement of data for the process discussed above with reference to FIG. 6. The elements of FIG. 7 are discussed above with respect to FIG. 3. That discussion will not be repeated here. Because the functional diagram may be better understood with simultaneous reference to FIGS. 6 and 7, reference will be made below to both.

Following the start 605, the process begins, optionally, with the receipt of a media invitation 610. This step is shown as optional because a user need not receive an invitation in order to access media. However, in some cases, an invitation may be received by a mobile device, for example from a "friend" who uploaded the media. If received, this request may point the user to a particular set of media that has been uploaded. However, the invitation need not identify any particular media at all because all requests for media are responded to based upon the mobile device making the request's location. Any user outside of that location will be unable to view the media while users nearby will be able to see all available media in a location. The invitation, if received, may be via a mobile application 738 or through a web browser 738 email or other system.

Next, or as a first step, the mobile device uses location service 737 to obtain its location at 615. This may be global positioning system or other location service. The location is necessary because all media is location gated. The mobile device 730 will only see or have access to media that is at the same location or within a pre-determined area around a location that encompasses the mobile device 730 location.

Next, at 620, an app or universal URL is accessed and the location determined at 615 is provided.

As used herein, the word "universal" means one and only one that is used by every user of the "universal" URL. Specifically, a universal URL is a single URL that is used for all requests from any user (not just unique to a specific user, but one used for any and all users). Specifically excluded from the meaning of "universal" are unique URLs such that each user and/or each media request incorporates any unique aspect, sub-directory, code, number, URL, friend relationship, access permissions, secret data, email address, handle, or other portion of a request that indicates in one form or another an identity associated with that user, the requested media, or any other authorization to access specific media. In the prior art, these have included unique URLs—one URL specific to each user, each request, or to a set of media to be consumed—or information associated with a user's mobile device, an account, or other identifying information. None of this information is provided along with or as a part of a "universal" URL. And, prior art systems reliant upon such capabilities are specifically excluded from the meaning of "universal" as used herein.

An example of such a URL is the URL www.air.cam. Every user requesting access to nearby uploaded media via a URL will input the same URL. There will be no path parameters or query parameters appended to this URL to identify a user, a set of media, or anything else. There will be no sub-directory identified or particular web page or URL shortener, or any other similar data. There will be no user ID, password, token, key, or anything else. All the user need input (or select) is that universal URL, www.air.cam. This may be accomplished via a web browser. As will be seen, the use of the "universal" URL is possible because the web browser or mobile application provides the mobile device's location to the server so that nearby media may be identified without the use of any other parameters.

Alternatively, this process of making a media request may take place via a mobile application 738. Whether or not the mobile application 738 has access to any other data about a specific user (e.g. a username, a social media account, etc.) the mobile application will only receive the request along with the location information for the mobile device at 620. No uniquely identifying data need be transmitted along with the request. This media request including the location may be seen at 750.

At 630, the server receives the media access request. At this step, the access processor 727 at the server 720 receives the request along with the location of the mobile device making the request. This may be received from a mobile application 738 or from a web browser 739. The use of the web browser enables anyone, including anyone without a user account or other specifically identifying information, to upload or access media that is within a geofenced area defined by a pre-determined area surrounding the mobile device. As may be appreciated, prior art methods and systems virtually all require an individual to have or create a user account or to provide some unique identifier associated with the media or the user requesting the media or the user who uploaded the media. The media request 750 that is received at 630 includes no such requirement, relying instead upon the location of the requesting mobile device compared to the geofenced area alone.

The access processor 727 then determines whether the associated location includes media at 635. This step does not search for usernames, associations between the two mobile devices or their users, any unique URL or anything similar. Instead, the access processor 727 merely determines whether or not a requesting mobile device 730 is at a location within a geofence made up of a pre-determined area with associated media. This is because there may be multiple sets of media available at a particular location. Or, the geofenced areas with one or more sets of media may overlap with one another at a particular location reported to a server by a mobile device.

To make this determination at 635, the access processor 727 reviews the share database 723 to determine if the location provided by the mobile device 730 is within the radius of one or more sets of media. For example, the location provided by the mobile device 730 may be a set of GPS coordinates, longitude and latitude, or within a location defined by the interior or exterior of a building, stadium or other venue. The media may include a location defined as a pre-determined area such as a radius of 500 feet, within which a geofence area is defined for the associated media. This may be stored in the share database in the form of a single location (e.g. GPS coordinates) and a distance (e.g. 500 feet) defining the pre-determined area around that location.

So, if the location provided by the mobile device 730 is within the pre-determined area of one or more sets of media, then the access processor may identify those simply by comparing the location provided by the mobile device 730 with the stored set of locations in the share database 723. Then, the access processor 727 may identify those with pre-determined areas that include the location provided by the mobile device 730.

If there is no media at the location provided by the mobile device 730 ("no" at 635), then the process ends at 695.

If there is media available at the location provided by the mobile device 730 ("yes" at 635), then a determination whether other settings enable access by the requesting mobile device 730 at 645. These settings may be or include a password, also being a "friend" on a social network with the user, being a member of a specific group of "friends," and similar limitations. However, these are in addition to, not a substitute for the location determination made at 635. Potentially, there may be no settings at all in which case, this determination is always "yes." Making this determination may involve accessing the user database 729 (e.g. to see user groups and memberships).

If the settings do not enable access ("no" at 645), then the user is denied access to the media and the process ends at 695.

If the settings do enable access ("yes" at 645), then the media in media storage 725 is accessed at 650 so as to identify the relevant media to which a particular mobile device 730 has access due to its location. As indicated above, this media may include multiple groups of media or sets of media. Media may be uploaded and stored in arbitrary groups (e.g. "collections") created by individuals or groups subscribing to the media. When this is done, the media may be presented as in a "location" but also may still be presented as within those particular groups.

After the media is accessed at 650, it is then provided to the requesting mobile device 720 at 660. If no media is available to a mobile device in a particular location, then the request may come back "blank" at 560. Otherwise, the request will simply provide access to available media at 760. The media may appear as a series of rows in a web browser such that a user may select one of the rows to be shown the entire "set" of media associated with a particular group of media. Or, all media available at a location may be aggregated into a single display of all available media.

At 670, the media is received by the mobile device 730. This receipt may take place within a mobile application 738 or, optionally, within a web browser 739. In general, this receipt will take place in one or the other that made the original request. The benefit of the web browser in particular is that no new application need be downloaded or installed in order to view and/or upload additional media. In this way, virtually anyone can participate in viewing media and in uploading additional media without reliance upon any user account, password, unique URL, hashtag or other system. Merely a universal URL and a location, which can be provided automatically by a mobile device 730, are all that are required to access media available in a location.

Figure 8:
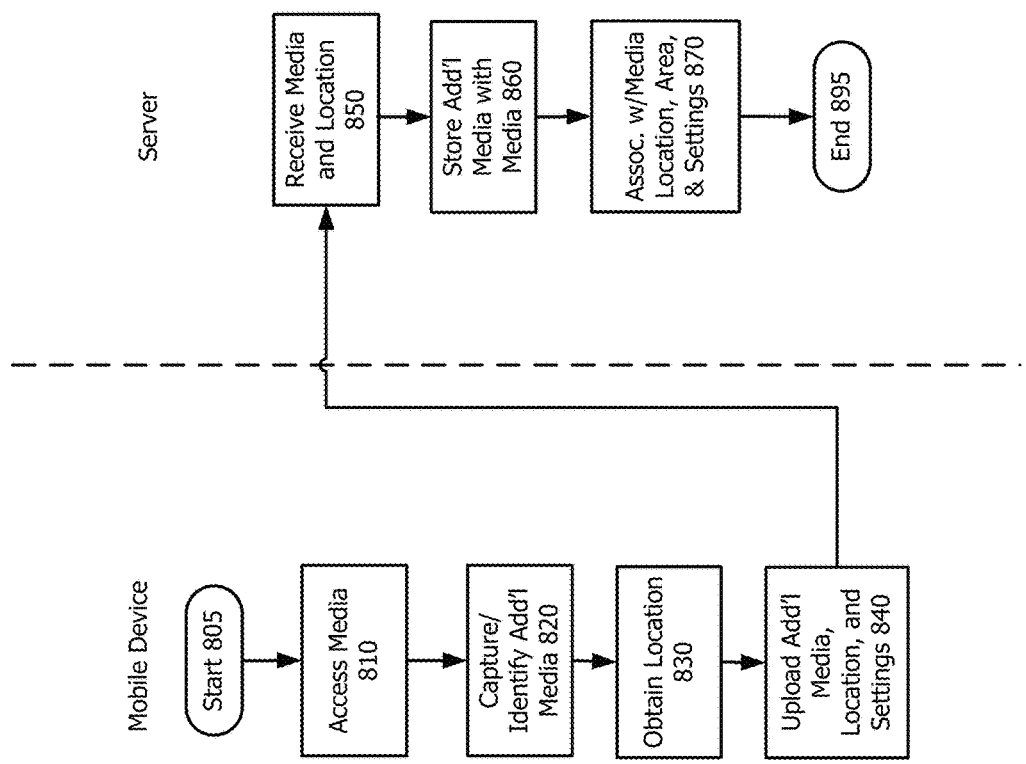
FIG. 8 is a flowchart of a process for additional media transmission and storage for a geofenced universal URL.

FIG. 8 is a flowchart of a process for additional media transmission and storage for a geofenced universal URL. The process begins at 805 and ends at 895, but may repeat for each individual media uploaded to a server. This figure in particular pertains to adding "additional" media to a group of media already uploaded by another mobile device within a particular location, but could apply to any media upload. The example that is most relevant to this scenario is a user without any mobile application reliant upon a web browser to upload additional media to a particular media group merely by being confirmed to be within the same location (and a pre-determined area thereabout) that defines a geofence area.

Figure 9:
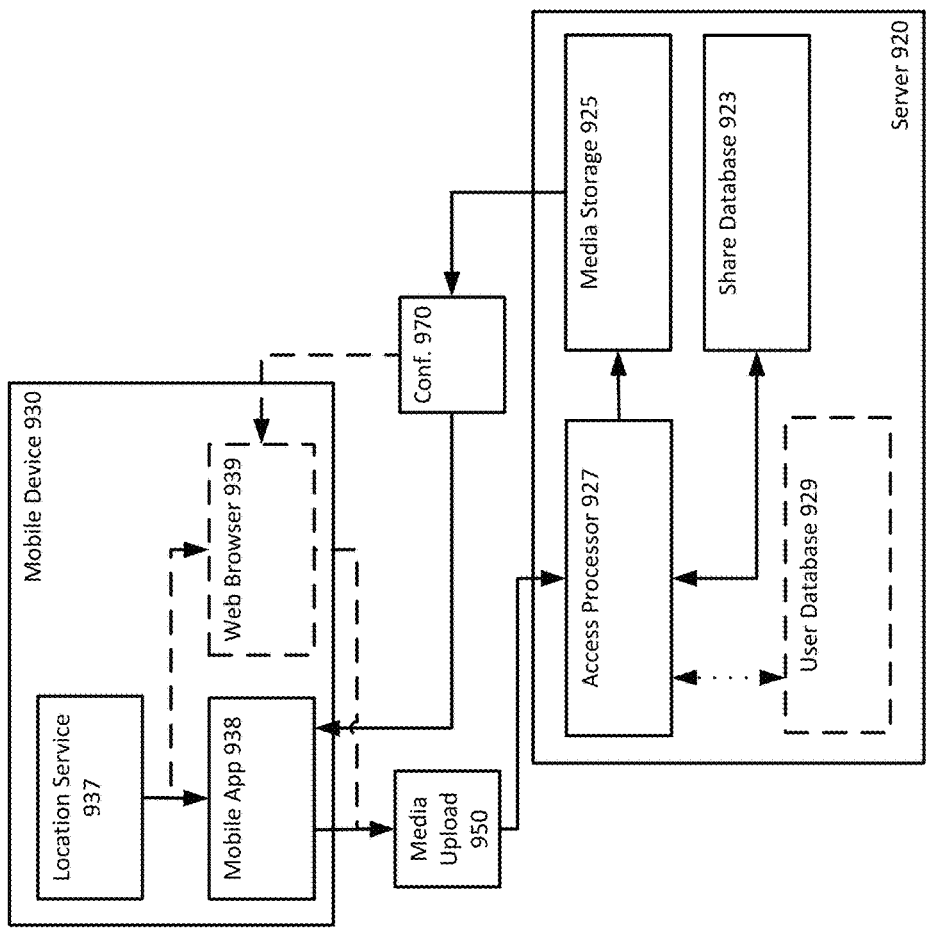
FIG. 9 is a functional diagram of a process for additional media transmission and storage for a geofenced universal URL.

FIG. 9, also cited herein, is a functional diagram of a process for additional media transmission and storage for a geofenced universal URL. This is a functional diagram showing the active functional components movement of data and requests for the process discussed above with reference to FIG. 8. The elements of FIG. 9 are discussed above with respect to FIG. 3. That discussion will not be repeated here. Because the functional diagram may be better understood with simultaneous reference to FIGS. 8 and 9, reference will be made below to both.

Following the start 805, the mobile device 930 may access media at 810. This access may be via the mobile application 938 or via a web browser 939. In either case, in order to gain access to the media, the location service 937 is accessed in order to provide a location along with the request. The process for accessing media is described above with reference to FIGS. 6 and 7.

The media is accessed so as to ensure that the mobile device is in a location from which uploading media to that same location is allowed and to confirm that the user has access to the media group (e.g., if it is password protected).

After the media is accessed at 810, then the mobile device 930 may capture or identify additional media at 820 that the user wishes to add to the media group at that location. The media may be captured (e.g., an image or video or audio recording made or taken) or may be identified (e.g., a previously-created image may be identified as one to be added to the group). While doing this, the mobile application 938 or the web browser 939 may be used. Additional functionality may be provided by the mobile application 938, but the web browser 939 has the benefit of not requiring any download or installation for virtually all mobile devices which are generally equipped with web browsers.

Before the upload is allowed, the location service 937 on the mobile device 930 may obtain the location of the mobile device 930 at 830. This location may be the current location of the mobile device 930. Alternatively, this location may be a geo-tag in the form of meta-data applied to the media itself that identifies a location at which the media was captured or created. Such a geo-tag may be used to confirm that the location associated with the media conforms to the location identified for the mobile device 930 itself at 830 to ensure that the media is actually relevant to the location.

Next, the additional media is uploaded along with the mobile device location and any settings at 840. This may take place via a "web app" that operates within the web browser 939 or via the mobile application 938. Either source may accept the input of any additional settings (e.g. altering the radius, adding a password, requiring group membership, etc.). The media is shown as uploaded as media upload 950.

At 850, the server 920 receives the media at associated location (along with any other settings). This receipt may be handled by the access processor 927 which stores the media in media storage 925 and adds or updates an entry in the share database 923 to indicate the location of the media, its association with any pre-existing media group, the pre-determined area (e.g. a radius) within which the media should be available and any other settings associated with the uploaded media. In some cases, these settings may be "controlled" by the original uploader of a particular media group and may not be altered by subsequent uploaders. In these cases, the upload of media to the particular media group may cause that media to "adopt" the settings associated with the other media in that media group.

The uploaded media is stored at 860 with the already-existing media in the media group. The media is stored in media storage 925.

The media is also associated in storage with the media location, radius and any other settings at 870. This information is stored in the share database 923 so that later mobile devices seeking to access the content may be confirmed to be in the appropriate location or within the geofence area, and to have met any other requirements to access the additional stored media.

The process then ends at 895.

Figure 10:
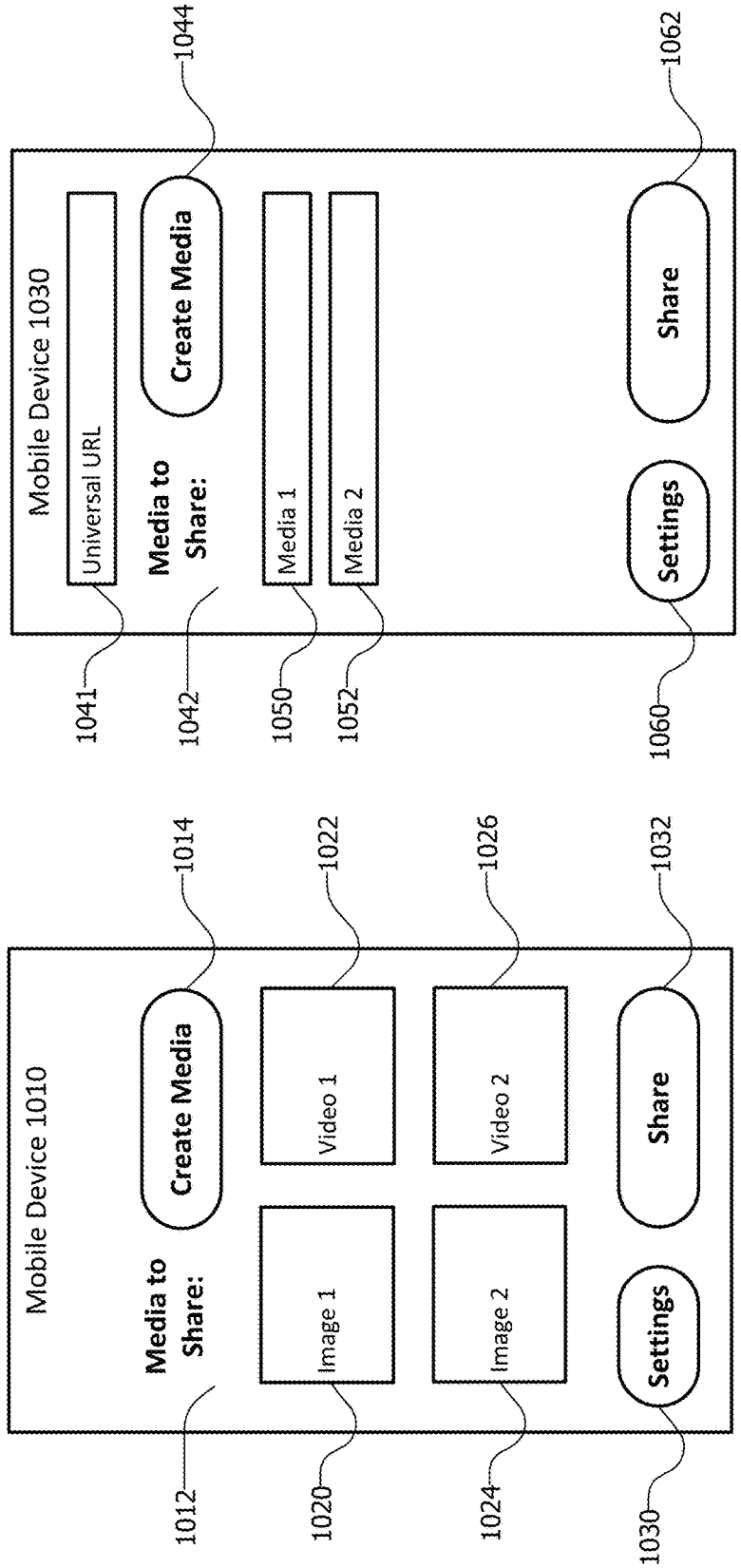
FIG. 10, made up of FIGS. 10A and 10B, are two graphical user interfaces for a media transmission, request, and access using a geofenced universal URL.

FIG. 10, made up of FIGS. 10A and 10B, are examples of graphical user interfaces for a media transmission, request, and access using a geofenced universal URL Turning first to FIG. 10A, an example mobile application interface (e.g., mobile application 418 in FIG. 4). A prompt 1012 identifies the application screen as showing "media to share." The location will be automatically obtained by the mobile application and is, therefore, not shown in the user interface. Alternatively, a user may create media by selecting the create media button 1014 to, for example, take a picture, create a video, insert a hyperlink or create other media when prompted.

An assortment of icons or thumbnails of images 1020, 1024 and videos 1022, 1026 are shown. These may be drawn from a "camera roll" or similar folder or file stored on the mobile device 1010. A user may be presented with the opportunity to scroll through any groupings of media to select one or more media he or she wishes to upload. Media may be uploaded one at a time or in a group. The user interface may "scroll" with user input of swipes or other interaction to show additional media that is not shown on this first screen. A user may select one or more of the media shown for upload to a server (e.g., server 420 in FIG. 4). The items may be selected through touch and may be highlighted through colors or shading or checkboxes on the media itself before sharing takes place. A user may share a single piece of media or multiple media at once.

Once media is selected, the user may utilize a "Settings" button 1030 to alter or otherwise change settings associated with the media about to share. Though not shown in detail, these settings may include radius associated with the media. In this way, a user may alter the pre-determined area of the geofence area within which others may access the shared media. A visualization of the pre-determined area in which the media will be shared may also be shown, for example, on a map of the surrounding area along with an option to alter the pre-determined area. A user may alter the time during which the media will be available from a few moments or minutes to up to many days or weeks. A user may add a password or other group membership. The user may alter the quality or size of the media being uploaded. Other settings for the shared media may also be changed.

The uploaded media may be thought of as a collection. An initiating uploader may start the collection, but may not be the only individual who is able to add to the collection. So, for example, if a collection is begun at a concert, the initiating uploader begins a collection called "concert." If the initiating uploader does not otherwise limit access to the collection (e.g. with a password, or a friend's connection between the initiating uploader), then any other individual may see and add to the collection. These may be thought of as collection settings (or the absence thereof).

There may also be settings for each piece of media on a user's mobile device. In this way, a particular collection may expire at a particular location and pre-determined area. However, the mobile device for that initiating uploader may have individual settings associated with one or more photographs, videos or other media stored on his or her mobile device such that it is always available or may be available for the remainder of an evening, day, week, month or other time-frame within a certain radius or other pre-determined area around that mobile device of that user. These may be thought of as individual media settings.

Other media added to a collection with its collection settings may adopt the settings for that collection (e.g. tied to a particular location, expiration date/time, passwords, etc.), however individual media settings or settings set by a particular user may still make that user's media available under different settings and those settings may be mobile or otherwise tied to the user's mobile device.

A collection of media may likewise be tied to a user's mobile device as he or she moves. The associated collection settings may also move along with the user's mobile device. However, media shared by others may or may not move with that user's mobile device—the initiating uploader's device. So, as the user's mobile device moves, media that was added in a particular location may cease to be available in the collection as the initiating uploader's device has moved.

The "Settings" button 1030 may initiate a dialog that enables settings associated with a collection. A user's mobile application on a mobile device (or a web page accessed by a user) may provide for settings associated with individual pieces of media on the user's mobile device or shared by the user's mobile device. These settings are distinct and, in general, individual user settings will be a baseline setting with collections to which a user uploads media taking precedence for the uploaded media for so long as the media is shared and available.

Turning to FIG. 10B, there is shown an interface for a web browser of a mobile device 1030 showing the universal or non-unique URL 1041. As discussed above, the non-unique URL is a single URL used for everyone, worldwide, who wishes to access or upload media. So, a user may type into his or her web browser the non-unique URL and be shown the available media in any geofence area including the associated mobile device's location. Here, the universal URL has been input with the intent to upload media as indicated by the "media to share" label 1042. As with the mobile application shown on mobile device 1010, the user may create media by selecting the create media button 1044.

Two pieces of media 1050, 1052 are shown as available to be uploaded. The settings button 1060 and share button 1062 are shown. Each of these has much the same function as within the mobile application. A user may select media to upload and may upload that media or alter settings with the share button 1062 and settings button 1060, respectively.

Figure 11:
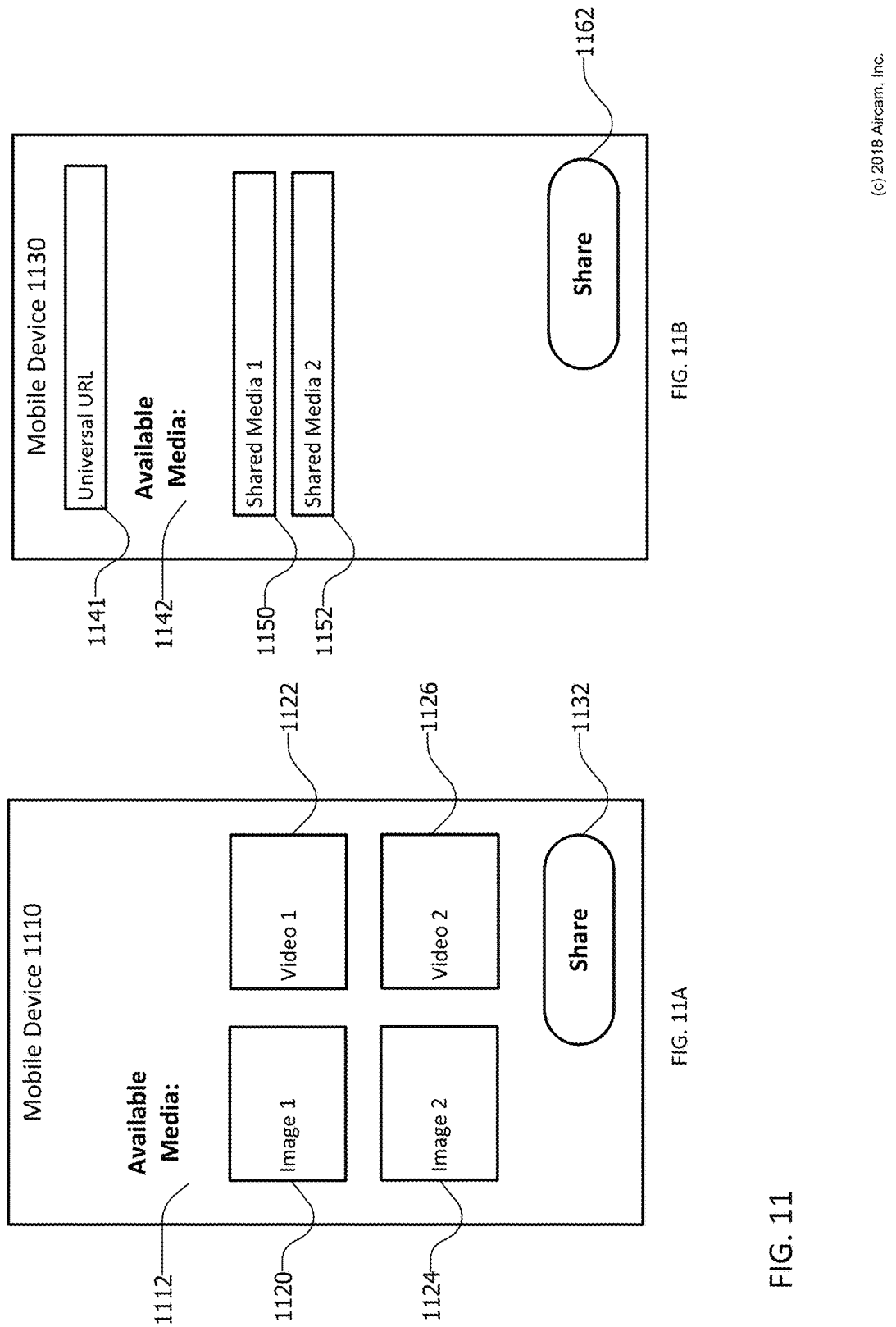
FIG. 11, made up of FIGS. 11A and 11B, are two a graphical user interfaces for access using a geofenced mobile application and web browser.

FIG. 11, made up of FIGS. 11A and 11B, are examples of graphical user interfaces for access using a geofenced mobile application and web browser.

Turning first to FIG. 11A, a mobile application user interface is shown wherein the location of the mobile device's 1110 has been determined an, as a result, the available media 1112 is shown on the interface. Specifically, two images 1120, 1124 and two videos 1122, 1126 are available at that location.

Though shown as a single collection of media, the media may be sub-divided into multiple collections of media, with each collection being selectable. Then, a user may browse through the collection which consists of individual pieces of media (e.g. individual pictures or videos). Each collection may have its own settings regarding location, pre-determined area, time, passwords and the like. The interface shown in FIG. 11A is after a collection of media has been selected. As a result, the individual media are being shown.

The user also has the option, using the share button 1132, to share additional media. This may bring up an interface similar to that shown in FIG. 10A.

Turning now to FIG. 11B, a web browser operating on mobile device 1130 is shown again using the universal URL 1141. Here, the screen being shown is the available media 1142. As before, the user need only input the universal URL into the browser and the browser will provide the mobile device 1130's location to the server which will respond with a web page including only the shared media 1150, 1152 that is available to the mobile device in that location. The media may be divided into collections or may be individually available. The web page provided to the web browser at the universal URL also provides the option to share media to the identified media groups using the share button 1162. This may bring up an interface similar to that shown in FIG. 10B.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. Apparatus for enabling access to media comprising a server, including processor and memory, the server executing instructions that cause the processor to:
   (A) store a universal uniform resource locator (URL) which is a single, precise URL which provides a one and only address from which the server will accept requests from users to access media;
   (B) communicate with plural upload media devices in respective different physical locations on respective, separate occasions to, with respect to each such communication:
      (i) receive media and a media location, the media location being the physical location from which the media was transmitted to the server by the respective upload media device;
      (ii) generate a geofence area defined by the media location and a pre-defined area around the location;
      (iii) store the media in a media storage in conjunction with the geofence area in a database; and
   (C) communicate with plural request devices on respective, separate occasions to, with respect to each such communication:
      (i) receive a request for media at the universal URL in its precise form, without any subdomains, extensions or variables, from a given one of the request devices along with a request device location indicating a location of the request device making the request, and
      (ii) compare only the request device location with the geofence areas in the database and, only when the request device location is within one of the geofence areas in the database, provide access to the corresponding media, and otherwise deny access to all of the media in the database.

2. The apparatus of claim 1 wherein the instructions will further cause the processor to transmit a webpage in response to the request that identifies only stored media within any geofence area including the request device location.

3. The apparatus of claim 1 wherein the instructions will further cause the processor to receive input of a password to access to the media along with the media and the media location and further wherein access to the media is limited to devices within the geofence area who also provide the password as a part of the request.

4. The apparatus of claim 1 further comprising:
   the upload media device which automatically provides the media location as a part of an upload process for the media; and
   wherein the request device automatically provides the request device location as a part of the request for the media.

5. The apparatus of claim 1 wherein the instructions will further cause the processor to accept input of the pre-defined area from the upload media device from which the media is received.

6. The apparatus of claim 1 wherein the instructions will further cause the processor to:
   receive a request from the request device to upload additional media to be stored in conjunction with the media, the request not including any login, password, account or identifying characteristic of any prior interaction with the server;
   store the additional media in conjunction with the media and the media location.

7. The apparatus of claim 1 wherein the request is received from a mobile application operating on the request device.

8. A method of enabling access to media comprising:
   (A) storing a universal uniform resource locator (URL) which is a single, precise URL which provides a one and only address from which a server will accept requests from users to access media;

(B) communicating with plural upload media devices in respective different physical locations on respective, separate occasions to, with respect to each such communication;
- (i) receiving media and a media location, the media location being the physical location from which the media was transmitted to the server by the respective upload media device;
- (ii) generating a geofence area defined by the media location and a pre-defined area around the location;
- (iii) storing the media in a media storage in conjunction with the geofence area in a database; and (C) communicating with plural request devices on respective, separate occasions to, with respect to each such communication:
- (i) receiving a request for media at the universal URL in its precise form, without any subdomains, extensions or variables, from a request device along with a request device location indicating a location of the request device making the request; and
- (ii) comparing only a request device location indicating a physical location of the request device making the request to the geofence areas in the database and, only when the request device location is within one of the geofence areas in the database, provide access to the corresponding media, and otherwise, deny access to all of the media in the database.

9. The method of claim 8 wherein providing access to the media includes transmitting a webpage in response to the request that identifies only stored media within any geofence area including the request device location.

10. The method of claim 8 further comprising receiving input of a password to access to the media along with the media and the media location and further wherein access to the media is limited to devices within the geofence area who also provide the password as a part of the request.

11. The method of claim 8 wherein the media location and the request device location are both obtained automatically by the upload device as a part of an upload process and by the request device as a part of the request process.

12. The method of claim 8 further comprising accepting input of the pre-defined area from the upload media device from which the media is received.

13. The apparatus of claim 8 further comprising:
receiving a request from the request device to upload additional media to be stored in conjunction with the media, the request not including any login, password, account or identifying characteristic of any prior interaction with the server;
storing the additional media in conjunction with the media and the media location.

14. The method of claim 8 wherein the request is received from a mobile application operating on the request device.

* * * * *